United States Patent Office 3,306,581
Patented Feb. 28, 1967

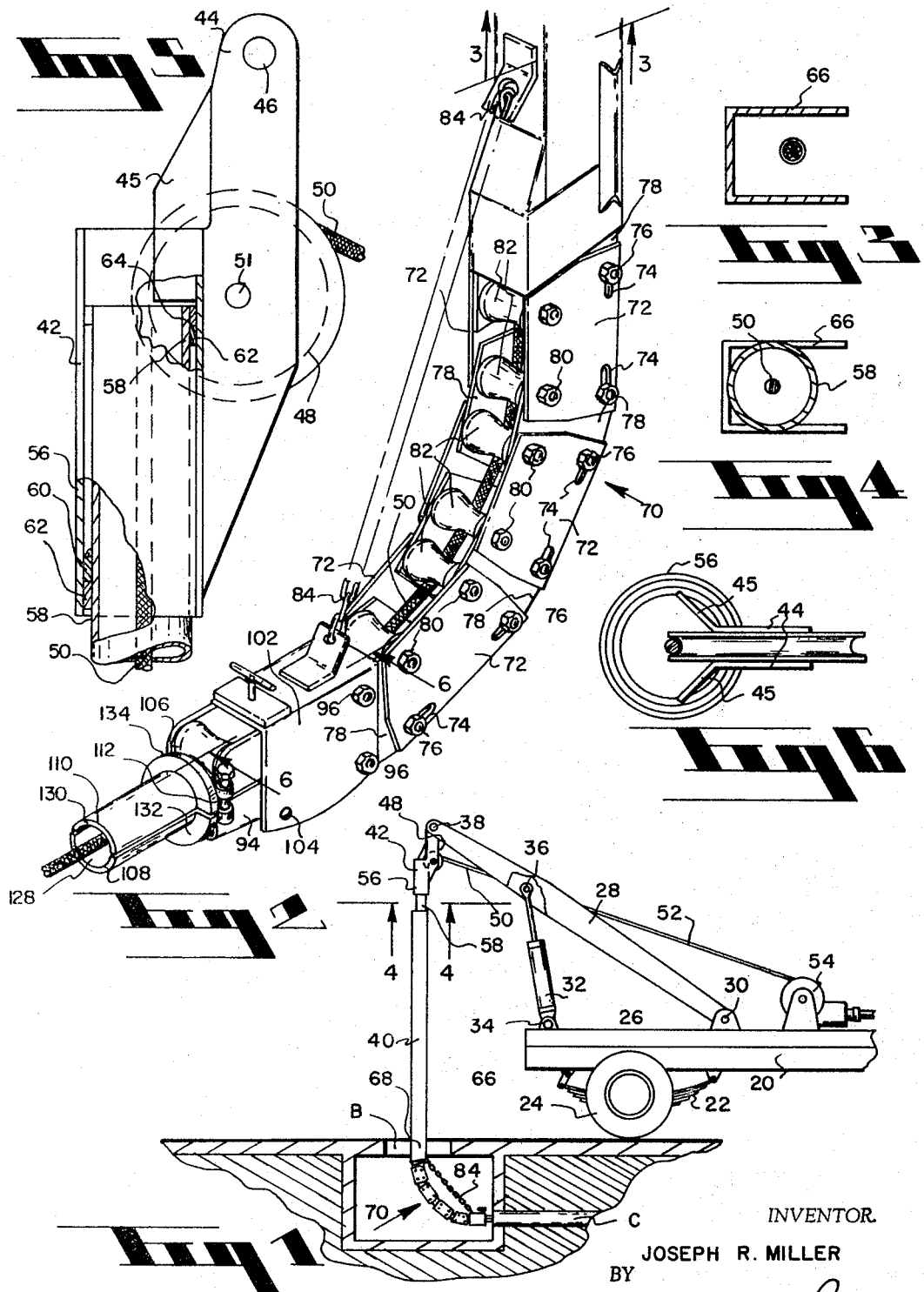

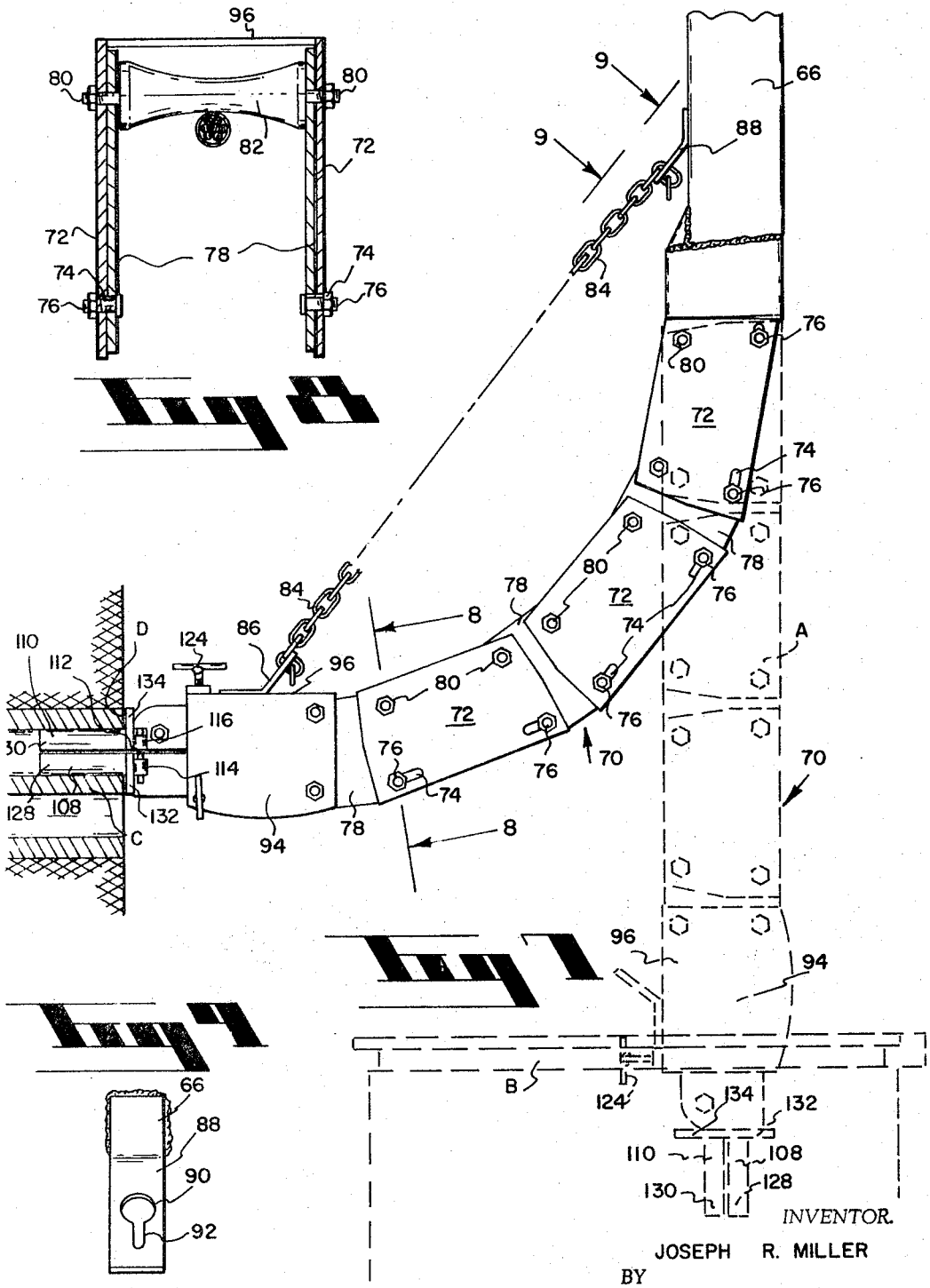

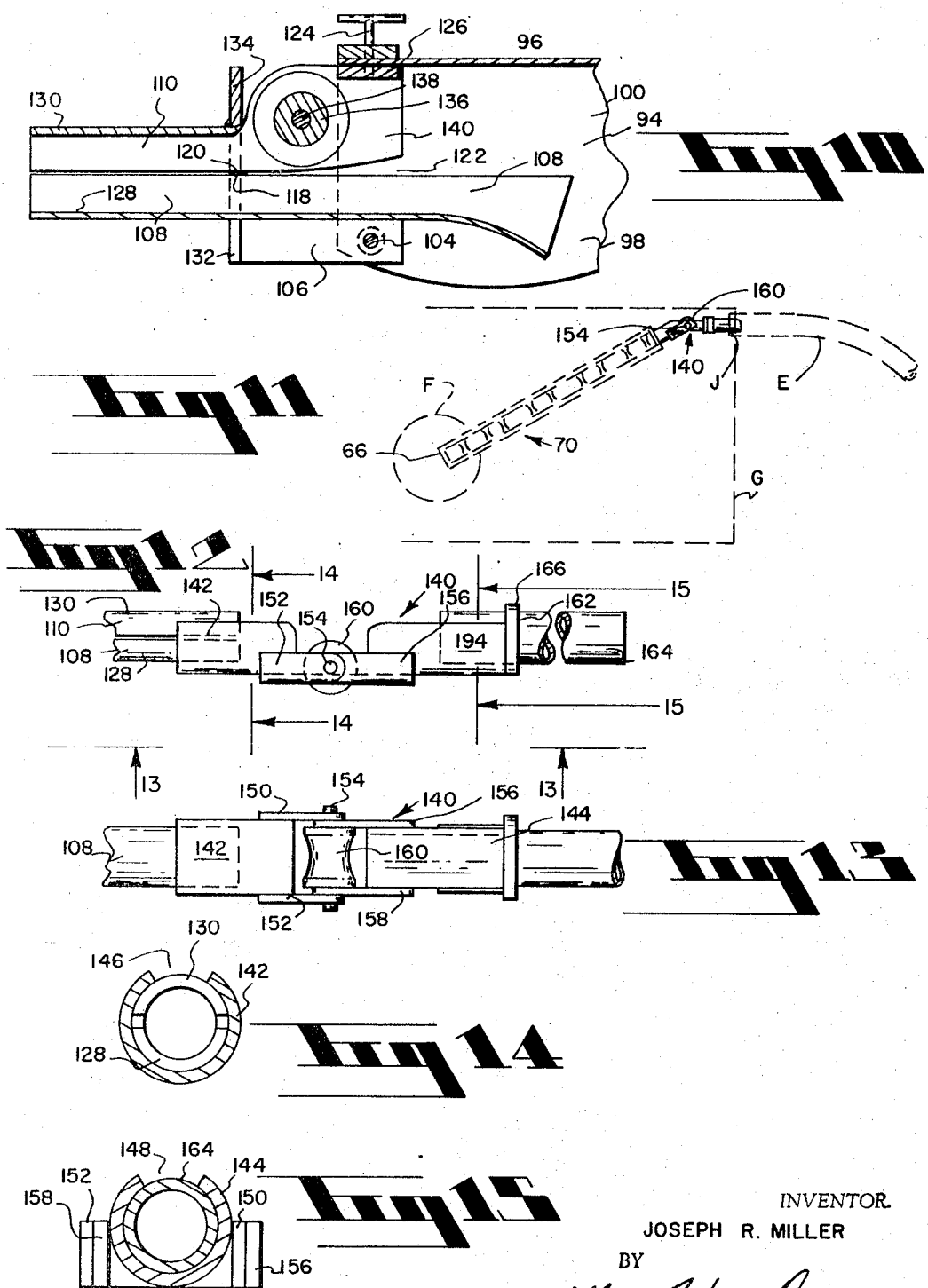

3,306,581
CABLE PULLING MECHANISM
Joseph R. Miller, Phoenix, Ariz., assignor to Arizona Utility Equipment Sales, Phoenix, Ariz., a corporation of Arizona
Filed Oct. 21, 1965, Ser. No. 500,419
7 Claims. (Cl. 254—134.3)

This invention relates to a cable pulling mechanism, and more particularly to a cable pulling mechanism which comprises a suspended means which may be suspended from a vehicle and extended downwardly and laterally into alignment and engagement with an underground conduit, which is accessible in a manhole below the surface of the ground.

Prior art cable pulling mechanisms which have been used in manholes have required means for holding them in place internally of the manhole and have required considerable time and effort for setting them up prior to a cable pulling operation, with respect to cable being pulled through underground conduits.

Additionally, conventional equipment used in cable pulling operations has required the attendance of several persons and laborers and particularly so with respect to the pulling of multiple conductor cables, such as large telephone cables, or the like, which require very substantial forces to pull such cables through underground conduits.

Accordingly, it is an object of the present invention to provide a novel cable pulling mechanism which employs a boom suspended from the bed of a vehicle; said boom having a flexible assembly of relatively pivoted plates carrying sheaves for disposition of such sheaves in a substantially arcuate row to provide a transition for guiding cable from a substantially vertical suspended position to a horizontal position in alignment with underground cable conduits, whereby cable may be pulled through such conduits and the force of pulling such cable tends to cause abutment of said flexible assembly with the end of such conduits and to thereby laterally support said vertically suspended boom, while a winch on the vehicle pulls the cable around said sheaves on said flexible assembly and upwardly through pulley means on the vertically suspended boom.

Another object of the invention is to provide a cable pulling mechanism which may be very quickly and easily inserted in a manhole and curved into lateral position and in engagement and alignment with a substantially horizontally disposed underground conduit.

Another object of the invention is to provide a cable pulling mechanism having a novel assembly of relatively pivoted plates supporting cable guide rollers, in an arcuate row, and an elbow mechanism having roller means therein on the lower end of the assembly of pivoted plates, whereby a substantially vertical boom may suspend the assembly of pivoted plates and the elbow readily to reach underground conduits, which are offset laterally with respect to the center of a manhole through which the vertically suspended boom of the mechanism is inserted.

Another object of the invention is to provide a cable pulling mechanism employing a substantially vertical boom having a plurality of pivotally connected plates carried on the lower end thereof, and which support a plurality of rollers in an arcuate row; the lower end of said assembly of plates having an extending abutment nozzle disposed to extend into an underground conduit and to abut the end thereof, whereby reaction force of pulling cables over said rollers axially of the conduit is resisted by abutment of the nozzle abutment portion, at the end of the conduit.

Another object of the present invention is to provide a cable pulling mechanism which is provided with a substantially vertical boom, which may be suspended from means on a vehicle; said vertical boom being adapted to swivel around a vertical axis and carrying a plurality of relatively pivoted plates on the lower end thereof; said pivoted plates supporting a plurality of rollers on substantially horizontal axes, which may thus be disposed in a curved row to make a transition from a vertical to a horizontal disposition with respect to cable engaging the rollers; a nozzle being disposed on the lower end of the assembly of pivoted plates to engage the interior of an underground conduit, whereby the swivelling capability of the vertical boom, about a vertical axis, permits the conduit engaging nozzle to be directed in any direction within a manhole to pull cable from various directions with respect to a given position of the vehicle, which supports the pulling mechanism.

Further objects and advantages of the present invention may be apparent from the following specification, appended claims and accompanying drawings, in which:

FIG. 1 is a fragmentary side elevational view of a wheel supported vehicle having a crane and winch thereon and suspending cable pulling mechanism of the present invention, which is shown in relation to the surface of the ground and the interior of a manhole, wherein underground conduit communicates and further showing a conduit engaging nozzle of the invention engaged with an open end of the conduit and the pulling mechanism of the invention in position to pull cable therethrough;

FIG. 2 is a perspective view of a lower portion of the cable pulling mechanism of the invention comprising the lower end of the vertical boom, a plurality of relatively pivoted plates carrying a plurality of cable guide rollers in a curved row and having a conduit engaging nozzle projecting from the lower end of the assembly of pivoted plates;

FIG. 3 is a sectional view taken from the line 3—3 of FIG. 2;

FIG. 4 is a sectional view taken from the line 4—4 of FIG. 1;

FIG. 5 is an enlarged side elevational view of an upper end of the vertical boom of the invention showing suspension means therefor and a cable guide sheave at the tops thereof and illustrating portions of the structure thereof broken away and in section to amplify the illustration;

FIG. 6 is a top or plan view of the upper end of the vertical boom of the invention taken from the line 6—6 of FIG. 5;

FIG. 7 is a side elevational view of the structure shown in FIG. 2 of the drawings, showing the conduit engaging nozzle of the invention ingated in an end of an underground conduit and abutting the end thereof, and further, illustrating by broken lines a varying position of the flexible plate assembly at the lower end of the pulling mechanism in relation to a manhole cover during the vertical insertion thereof, through the manhole and into the room therebelow;

FIG. 8 is an enlarged sectional view taken from the line 8—8 of FIG. 7;

FIG. 9 is an enlarged fragmentary elevational view taken from the line 9—9 of FIG. 7;

FIG. 10 is an axial sectional view through the extending nozzle mechanism of the invention, which is adapted to be positioned in an underground conduit;

FIG. 11 is a reduced plan view, showing by broken lines, a manhole and an underground room therebelow, and illustrating an underground conduit offset relative to the center of the manhole and showing an elbow of the invention connected to an assembly of flexible plates having cable guide rollers thereon, whereby the cable pulling mechanism of the invention may provide for access to the offset underground conduit, through the conventional vertical manhole;

FIG. 12 is an enlarged side elevational view of the elbow structure shown in FIG. 11;

FIG. 13 is a view taken from the line 13—13 of FIG. 12;

FIG. 14 is a sectional view taken from the line 14—14 of FIG. 12; and

FIG. 15 is a sectional view taken from the line 15—15 of FIG. 12.

As shown in FIG. 1 of the drawings, the cable pulling mechanism of the invention is mounted on a conventional truck chassis 20, or any other portable vehicle structure. This chassis 20 is provided with a wheel suspension 22, consisting of the conventional axle housing and springs on which ground engaging wheels 24 are rotatably mounted to support the chassis 20.

Mounted on a bed structure 26 of the chassis 20 is a conventional crane boom 28 having a pivotal bearing support 30 and a hydraulically powered cylinder 32 having its lower end pivoted at 34 on the bed 26; this cylinder 32 is provided with a plunger pivotally connected at 36 to the boom 28 to elevate and lower this boom.

A pin 38 passing through the upper end of the boom 28 suspends a suspended boom 40 forming part of the cable pulling mechanism of the present invention.

A swivel housing 42, at the upper end of the suspended boom structure 40, is shown in detail in FIGS. 5 and 6. This structure comprising a pair of upstanding bearing portions 44 having openings 46 which receive the bolt or pin 38, as shown in FIG. 1 of the drawings. The openings 46 thus provide for pivotal suspension of the suspended boom 40 about a horizontal axis.

Mounted between the members 44 is a sheave 48 rotatable on an axle 51 which passes through the plate members 44.

A cable 52 passes over this sheave 48 and is wound on a winch drum 54 for pulling the cable 52, as will be hereinafter described in detail.

The swivel housing 42 is composed of a hollow cylindrical tube 56, shown in FIGS. 5 and 6 of the drawings. This tube 56 is welded to angular portions 45 of the bearing plates 44, and rotatably mounted in this tube 56 is a tubular swivel member 58. This tubular swivel member 58 is provided with an annular shoulder bearing 60 which rotates against a bearing 62 held captive by welding, or otherwise, internally of the tube 56. An upper end of the tube 58 is also axially abutted by means of its bearing 62 abutting another ring-shaped bearing 64 fixed on the inner side of the tube 56. The tube 58 is, therefore, capable of rotating 360 degrees inside the tube 56 and relative to the boom 28.

Welded to the tube 58 is a channel-shaped portion 66 of the boom 40, as shown best in FIGS. 1, 2, 3 and 4 of the drawings.

Fixed to a lower end portion 68 of the channel structure 66 is a flexible plate and roller assembly 70, specifically disclosed in FIGS. 2 and 7 of the drawings. This assembly 70 is provided with a plurality of plates 72 which are provided with slotted bolt holes 74, through which bolts 76 are disposed; these bolts 76 extend through plates 78 which overlap the plates 72 and, thus permit relative movement of the plates 72 and 78, as will be hereinafter described.

Bolts 80 pass through both the plates 72 and 78 and these bolts 80, also, form axles for cable guide rollers 82, which are disposed between the plates 78. Thus, plates 78 engage opposite ends of all of the rollers 82; the bolts 80 extend through the rollers and form axles therefore and the plates 72 overlap the plates 78 and are provided with slotted bolt holes to permit sliding adjustment of the plates 72 relative to the plates 78, so that the entire assembly may be in a straight position, as indicated by broken lines A in FIG. 7 of the drawings, for insertion through a manhole B, and then the plates may be relatively adjusted into a solid line position, as shown in FIG. 7, and held in such position by a chain 84 which spans the assembly of plates; the chain 84 being held by a fixture 86 at the lower end of the assembly and a fixture 88 at the upper end of the assembly, these fixtures having bayonet slots, as shown in FIG. 9 comprising an enlarged opening portion 90 and a reduced opening portion 92 to hold the cross-link of a chain captive, so that the chain heretofore may be adjusted to hold the assembly 70 of the plates in a desired curbed position to maintain the row of rollers 82 in a curved or arcuate row to guide cable from a vertical position in alignment with the vertical boom 40 to a horizontal position in alignment with an underground conduit C, as shown best in FIGS. 1 and 7 of the drawings.

The lower end of the adjustable plate assembly 70 is provided with a nozzle frame 94 connected to the lowermost pair of plates 78 by bolts 96.

As shown in FIGS. 2, 7 and 10, the nozzle frame 94 is a substantially channel-shaped structure having a closed side 96 and an open side 98, with opposite side walls 100 and 102. A crossbolt 104 extends transversely across this frame 94 and provides a pivotal mount for plates 106, which carry a semicircular in cross-section portion 108 of a nozzle structure. Another semicircular in cross-section nozzle portion 110 is loosely coupled to the nozzle member 108 by means of a pair of bolts 112 extending through bushings 114 and 116 connected to the nozzle members 108 and 110, respectively. The bolts 112 are loose in these bushings 114 and 116 and adjacent edges 118 and 120 of the nozzle members 108 and 110, respectively, as shown in FIG. 10, bear against each other and are provided with clearance at 122 in order to permit a tightening screw 124 to bear downward on an end 126 of the nozzle member 110 and, to thereby spread the outer portions 128 and 130 of these nozzle members 108 and 110, apart to expand the same internally of a conduit C, as shown in FIG. 7 of the drawings. Connected to the nozzle members 108 and 110 are abutment flanges 132 and 134; these flanges being semicircular and adapted to abut an end D of the conduit C, all as shown best in FIG. 7 of the drawings.

Rotatably mounted in connection with the nozzle member 110 is a cable engaging roller 136 carried by an axle 138 extending through opposite side plates 140 of the nozzle member 110. The hub of this roller 136 is adapted to provide an engaging guide for a cable to be pulled through the nozzle structure formed by the nozzle members 108 and 110, as will be hereinafter described.

As shown in FIGS. 11 to 15 of the drawings, the invention also comprises an elbow structure disposed to be used with the slotted plate and lower assembly of the invention 70 for pulling cable through a conduit E, shown by broken lines in FIG. 11 of the drawings. This view is a plan view, wherein the location of a manhole is designated at F, and a room of the manhole below street level designated G. It will be seen from FIG. 11, that the center of the manhole is usually centered above the room G, but some conduits, such as the conduit E, may be offset with relationship to the center of the manhole F, such as to be difficult to approach with the assembly 70 and, thus, the elbow structure generally designated 140 in FIG. 11 is illustrated in detail in FIGS. 12 to 15, inclusive. This elbow structure 140 comprises a pair of engaging sections 142 and 144 which are slightly more than semicircular in cross section, as shown in FIGS. 14 and 15. These holding sections 142 and 144 are open at their respective sides 146 and 148 in order to be readily installable and removable laterally over cable being pulled through the conduit E as will be hereinafter described in detail.

The holding section 142 fits over the hereinbefore described nozzle portions 128 and 130 of the nozzle members 108 and 110. A pair of hinge plates 150 and 152 are conncetcd to the member 142 and are pivoted by means of a pin 154 to similar pivot plates 156 and 158 connected to the holding member 144. The pin 154 thus forms a pivotal connection for the plates 150 and 152 with the plates 156 and 158. A cable guide roller 160 is pivotally mounted on the pin 154 and serves to guide cable being pulled at an angle between the assembly 70 and the conduit E.

The holding member 144 receives a tubular nozzle structure 162 which is provided with an end 164 adapted to fit into an end J of the conduit E, said end J being that which is open into the manhole room G. Thus, the end 164 works similarly to the ends 128 and 130 of the nozzle members 108 and 110, hereinbefore described. This nozzle portion 164, however, is not expandable, but is held in abutted relation with the end J of the conduit E by means of a peripheral flange 166 which serves a similar purpose with relation to the flanges 132 and 134, hereinbefore described.

In operation, it will be seen that the vertical boom 66 may lower the pivoted plate assembly 70 into a manhole B, as shown in FIG. 7. When the plate assembly 70 is in a straight condition, as indicated by broken lines in FIG. 7, the assembly 70 may then be pivoted into the curved position, as shown in FIG. 7, and the chain 84 hooked in position to hold the curved relationship of the assembly to maintain the rollers 82 in a smooth curved row. The cable 50 may then be pulled through the respective conduit C to draw a multiconductor telephone cable or other heavy cable through the conduit C and into the room below the manhole B. During the application of tension by the cable 50 bearing on the rollers 82, the abutment flanges 132 and 134 on the nozzle members 108 and 110 bear against the end of the conduit C and this provides the entire force reaction abutment facility for pulling very heavy loads and very large stiff cable through the conduit C.

It will be understood that the entire suspended boom and the pulling assembly may be swiveled approximately 360 degrees about the axis of the tube 58 and the tube 56, as hereinbefore described, while maintaining the pulley 48 and cable 50 in alignment with the winch 54.

As hereinbefore described in connection with the structure shown in FIGS. 11 to 15, the elbow assembly 140 permits a compound angle to be attained in the pulling of cable, and namely, that of holding the assembly 70 in a position similar to that disclosed in FIG. 2 and then to make a bend through the elbow 140 about a vertical axis of the pin 154 and around the axis of the pulley 160 over which the cable travels as it passes through the nozzle 164 and through the nozzle elements 108 and 110. Thus, the cable may be pulled through the conduit E which is offset relative to the center of the manhole F downwardly through which the vertical boom member 66 projects and supports the plate and sheave assembly 70, all as hereinbefore described.

It will be obvious to those skilled in the art that various modifications of the present invention may be resorted to in a manner limited only by a just interpretation of the following claims.

I claim:

1. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a substantially vertical boom having a lower end to which said plurality of plates is connected; a crane boom supporting an upper end of said vertical boom; a vehicle for supporting said crane boom; cable handling means on said vehicle means for guiding cable relative to said crane boom and said vertical boom for feeding cable downwardly parallel to said vertical boom and over said rollers between said plates; and nozzle means carried by the lower end of said plurality of plates; means for abutting said nozzle adjacent the end of an underground conduit and for aligning said nozzle therewith, so that cable may be pulled through said conduit and said nozzle over said rollers and upwardly parallel with said vertical boom and onto said cable handling means on said vehicle.

2. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a vertical boom having a lower end to which said plurality of plates is connected; an upper end of said vertical boom having means for pivotally supporting the same; a vertical axis swivel means of said last mentioned means permitting rotation of said vertical boom about a vertical axis; and nozzle means connected to a lower end of said plurality of plates and adapted to guide a cable therethrough; and means for locating and abutting said nozzle means in alignment with an open end of an underground conduit.

3. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by a slidable movement of said bolts in said slotted openings of said plates so that said plurality of pairs of plates may be relatively adjusted about said bolts at said slotted openings to accomplish a substantially arcuate assembly of said pair of plates; and cable guide sheaves rotatably mounted between said pairs of plates and capable of being arranged in an arcuate row relative to each other for guiding cable thereon; a substantially vertical boom having a lower end to which said plurality of plates is connected; a crane boom supporting an upper end of said vertical boom; a vehicle for supporting said crane boom;

cable handling means on said vehicle means for guiding cable relative to said crane boom and said vertical boom for feeding cable downwardly parallel to said vertical boom and over said rollers between said plates; and nozzle means carried by the lower end of said plurality of plates; means for abutting said nozzle adjacent the end of an underground conduit and for aligning said nozzle therewith, so that cable may be pulled through said conduit and said nozzle over said rollers and upwardly parallel with said vertical boom and onto said cable handling means on said vehicle; expandable means of said nozzle means insertable into an open end of an underground conduit and expandable therein for securing said nozzle means in said conduit.

4. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a vertical boom having a lower end to which said plurality of plates is connected; an upper end of said vertical boom having means for pivotally supporting the same; a vertical axis swivel means of said last mentioned means permitting rotation of said vertical boom about a vertical axis; and nozzle means connected to a lower end of said plurality of plates and adapted to guide a cable therethrough; and means for locating and abutting said nozzle means in alignment with an open end of an underground conduit; an expandable means of said nozzle means insertable into an underground conduit and expandable therein for securing said nozzle means in said conduit.

5. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a substantially vertical boom having a lower end to which said plurality of plates is connected; a crane boom supporting an upper end of said vertical boom; a vehicle for supporting said crane boom; cable handling means on said vehicle means for guiding cable relative to said crane boom and said vertical boom for feeding cable downwardly parallel to said vertical boom and over said rollers between said plates; and nozzle means carried by the lower end of said plurality of plates; means for abutting said nozzle adjacent the end of an underground conduit and for aligning said nozzle therewith, so that cable may be pulled through said conduit and said nozzle over said rollers and upwardly parallel with said vertical boom and onto said cable handling means on said vehicle; said cable guide sheaves normally mounted on a horizontal axis; a guide elbow connected to said nozzle means and having a roller disposed on a substantially vertical axis, said guide means pivoted about the axis of said roller and having further nozzle means insertable into an open end of an underground conduit whereby a cable guided over said sheaves may be guided over said last mentioned roller to accomplish the disposition of said vertical boom through a manhole and to reach and guide through relative to an underground conduit which is offset laterally from the vertical axis of the manhole.

6. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a vertical boom having a lower end to which said plurality of plates is connected; an upper end of said vertical boom having means for pivotally supporting the same; a vertical axis swivel means of said last mentioned means permitting rotation of said vertical boom about a vertical axis; and nozzle means connected to a lower end of said plurality of plates and adapted to guide a cable therethrough; and means for locating and abutting said nozzle means in alignment with an open end of an underground conduit; an elbow mechanism coupled to said nozzle means and having roller gluide means disposed on a vertical axis over which cable may be disposed, said elbow composed of a pair of guide sections pivoted together about the axis of said last mentioned roller; said elbow having a nozzle portion disposed to be inserted in an open end of an underground conduit, thereby permitting disposition of said vertical boom in a manhole and disposition of said last mentioned nozzle means in an underground conduit which is offset laterally relative to the vertical axis of the manhole.

7. In a cable guide mechanism, the combination of: a plurality of pairs of plates, each pair of plates having bolts extending therethrough in spaced relation to each other, thereby holding them in spaced relation to each other; said pairs of plates disposed in overlapping relationship to each other and pivoted on said bolts adjacent first edges of said pairs of plates; slotted openings extending through said plates at said overlapping portions of said pairs of plates, some of said bolts extending through said slotted openings whereby said plates are pivotally mounted and connected together by said bolts adjacent said first edges of said pairs of plates and are slidably and movably adjustable relative to each other by slidable movement of said bolts in said slotted openings of said plates so that said plurality of pairs of plates may be relatively adjusted about said bolts at said slotted openings to accomplish a substantially arcuate assembly of said pairs of plates; and cable guide sheaves rotatably mounted between said pairs of plates and capable of being arranged in an arcuate row relative to each other for guiding cable thereon; a vertical boom having a lower end to which said plurality of plates is connected; an upper end of said vertical boom having means for pivotally supporting the same; a vertical axis swivel means of said last mentioned means permitting rotation of said vertical boom about a vertical axis; and nozzle means connected to a lower end of said plurality of plates and adapted to guide a cable therethrough; and means for locating and abutting said nozzle means in alignment with an open end of an underground conduit; an elbow mechanism coupled to said nozzle means and having roller guide means disposed on a vertical axis over which cable may be disposed, said elbow composed of a pair of guide sections pivoted together about the axis of said last mentioned roller; said elbow having a nozzle portion disposed to be inserted in an open end of an underground conduit, thereby permitting disposition of said vertical boom in a manhole and disposition of said last mentioned nozzle means in an underground conduit which is offset laterally relative to the vertical axis of the manhole; said sections of said elbow means being partially cylindrical and having open portions on one side thereof directed laterally with respect to the axis of said roller, whereby said elbow may be removed from cable after the cable has been pulled through an underground conduit and around said sheaves.

No references cited.

WILLIAM FELDMAN, *Primary Examiner.*

OTHELL M. SIMPSON, *Examiner.*